United States Patent
Morinaga et al.

(10) Patent No.: US 6,704,177 B2
(45) Date of Patent: Mar. 9, 2004

(54) MAGNETIC HEAD WITH MAGNETIC DOMAIN CONTROL STRUCTURE HAVING ANTIFERROMAGNETIC LAYER AND MAGNETIC LAYER

(75) Inventors: Akira Morinaga, Odawara (JP); Takayoshi Ohtsu, Ohi (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 10/075,241

(22) Filed: Feb. 15, 2002

(65) Prior Publication Data

US 2003/0076635 A1 Apr. 24, 2003

(30) Foreign Application Priority Data

Oct. 22, 2001 (JP) ......................... 2001-322952

(51) Int. Cl.$^7$ ................................. G11B 5/39
(52) U.S. Cl. ................................. 360/324.12
(58) Field of Search ..................... 360/324.1, 324.11, 360/324.12, 324.2

(56) References Cited

U.S. PATENT DOCUMENTS

| | | | | |
|---|---|---|---|---|
| 4,663,685 A | * | 5/1987 | Tsang | 360/327.32 |
| 5,739,990 A | * | 4/1998 | Ravipati et al. | 360/324.12 |
| 6,157,526 A | * | 12/2000 | Watanabe et al. | 360/324.12 |
| 6,324,037 B1 | * | 11/2001 | Zhu et al. | 360/324.12 |
| 6,483,674 B1 | * | 11/2002 | Kanai et al. | 360/324.12 |
| 2001/0033465 A1 | * | 10/2001 | Noma et al. | 360/324.12 |
| 2002/0015269 A1 | * | 2/2002 | Iwasaki et al. | 360/324.12 |

FOREIGN PATENT DOCUMENTS

| | | |
|---|---|---|
| JP | 3-125311 A * | 5/1991 |
| JP | 09-282618 A * | 10/1997 |
| JP | 11-203634 A * | 7/1999 |
| JP | 2000-331320 A * | 11/2000 |
| JP | 2001-084527 A * | 3/2001 |

* cited by examiner

*Primary Examiner*—Jefferson Evans
(74) *Attorney, Agent, or Firm*—Antonelli, Terry, Stout & Kraus, LLP

(57) ABSTRACT

A magneto-resistive effect head includes a magnetic domain control construction using both of an antiferromagnetic film and a magnetic domain control layer made of a magnet layer. The head is constructed by: an antiferromagnetic layer; a pinned layer which is formed on the antiferromagnetic layer and whose magnetizing direction has been fixed; a spacer formed on the pinned layer; a free layer formed on the spacer; magnetic domain control layers having antiferromagnetic films and magnet layers for performing a magnetic domain control of the free layer; and a pair of lead layers for supplying a current to a stack of the antiferromagnetic layer, pinned layer, spacer, and free layer. Thus, even for realization of a narrow track, a magneto-resistive effect head having large sensitivity and small side reading can be realized.

18 Claims, 5 Drawing Sheets

MAGNETIC HEAD WITH MAGNETIC DOMAIN CONTROL STRUCTURE HAVING ANTIFERROMAGNETIC LAYER AND MAGNETIC LAYER

BACKGROUND OF THE INVENTION

1. Field of the Invention

The invention relates to a magneto resistive effect head for reading a record from a recording medium by using the magneto-resistive effect.

2. Description of the Prior Art

Usually, a magnetic head provided in a hard disk drive (HDD) includes: a writing head for writing information as a magnetization signal onto a recording medium (hard disk); and a reproducing head for reading the signal recorded as a magnetization signal on the recording medium. Since the reproducing head is constructed by a stack including a plurality of magnetic thin films and non-magnetic thin films and reads the signal by using the magneto-resistive effect, it is called a magneto-resistive effect head. There are a few kinds of stacking structures of the magneto-resistive effect head and they are classified into an AMR head, a GMR head, a TMR head, and the like in accordance with a principle of magneto-resistance which is used. An input magnetized field entered from the recording medium into the reproducing head is extracted as a voltage change by using an AMR (Anisotropy Magneto-Resistive effect), a GMR (Giant Magneto-Resistive effect), or a TMR (Tunneling Magneto-Resistive effect).

In the stack layer of the reproducing head, a magnetic layer whose magnetization is rotated by receiving the input field from the recording medium is called a free layer. To suppress various noises such as a Barkhausen noise and the like or to control an asymmetry output, it is important to convert the free layer into a single domain in a track width direction. If the free layer has a magnetic domain without being converted into the single domain, the free layer receives the input magnetized field from the recording medium, so that a domain wall movement occurs and becomes a cause of the noise.

Figure 8:
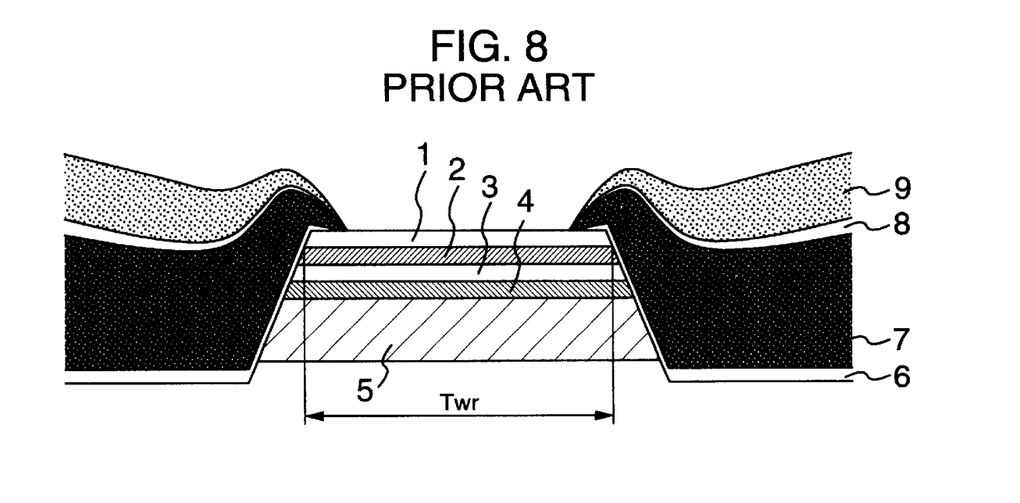
FIG. 8 is a diagram showing a magnetic domain control construction using a conventional magnet layer.

As a method of the magnetic domain control for converting the free layer into the single domain, for example, as disclosed in JP-A-3-125311, there is a method whereby magnetic domain control layers including magnet layers are arranged at both ends of the free layer, and a magnetic field which is caused in the track width direction from the magnet layers is used. FIG. 8 shows a schematic diagram which is obtained when a magneto-resistive head subjected to the magnetic domain control by such a method is seen from an air bearing surface. A free layer 2 is formed via a spacer 3 over a soft magnetic layer (called a pinned layer) 4 and magnetization of the soft magnetic layer 4 has been fixed by an antiferromagnetic layer 5. A cap layer 1 is formed on the free layer 2. A width of free layer 2 is called a track width Twr. Both ends of the stack of the antiferromagnetic layer 5 are shaved from the cap layer 1 by ion milling or the like, so that a device has a trapezoidal shape when it is seen from the air bearing surface as shown in FIG. 8. A structure of the head of FIG. 8 is characterized in that magnetic domain control layers 7 including magnet layers are arranged to both ends of the device via seed layers 6. According to such a structure, a magnetization distribution of the free layer 2 is controlled by using a magnetic field which is developed from the magnetic domain control layers 7 and the free layer is converted into the single domain.

Figure 9:
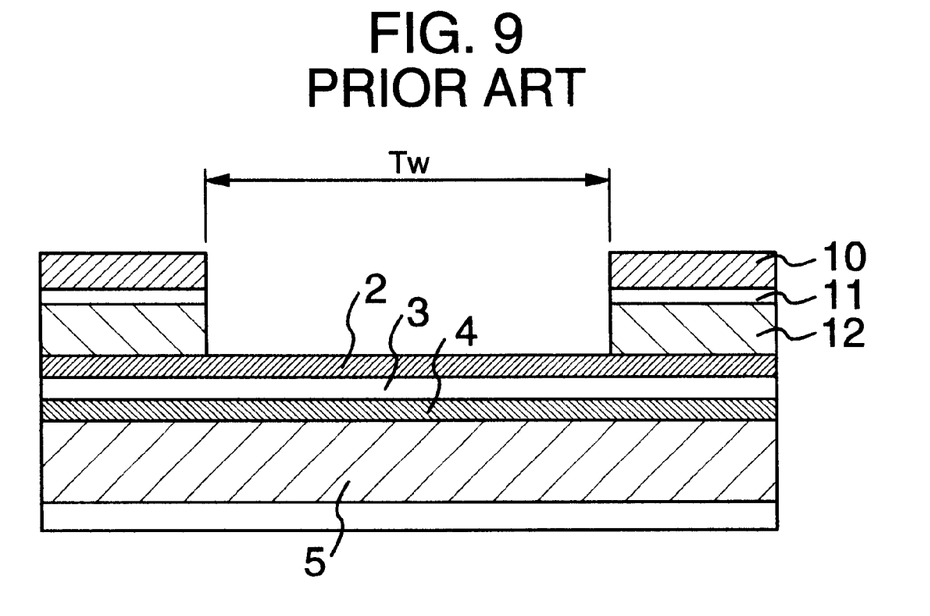
FIG. 9 is a diagram showing a magnetic domain control construction using a conventional antiferromagnetic film.

As another method of the magnetic domain control, for example, as shown in U.S. Pat. No. 4,663,685, there is a method whereby antiferromagnetic films are stacked on both ends of a free layer and an exchange coupling between the antiferromagnetic film and the free layer is used. FIG. 9 shows a schematic diagram which is obtained when a magneto-resistive effect head subjected to the magnetic domain control by such a method is seen from an air bearing surface. A structure of the head of FIG. 9 is characterized in that the free layer 2 is formed via the spacer 3 over the soft magnetic layer (called a pinned layer) 4 whose magnetization has been fixed by the antiferromagnetic layer 5, and antiferromagnetic films 12 are stacked at both ends of an upper portion of the free layer 2.

A magnetic domain control is performed by an exchange interaction which acts between the antiferromagnetic film 12 and free layer 2. The free layer 2 is formed so as to be wider than the width of track written on the recording medium and has a shape such that end regions are fixed. According to such a structure, therefore, a record is read by a portion Tw (of the free layer 2) between the antiferromagnetic films 12 (such a portion is called a sensing region). A lead layer 10 is stacked over the upper surface of the antiferromagnetic film 12 via a seed layer 11. It is not always necessary to form the seed layer 11.

As shown in JP-A-11-203634, there is also a method of stacking an antiferromagnetic layer having a uniform thickness onto the whole surface of a free layer, or the like. However, since a track width of the present head is very narrow, there is a fear that, if the whole surface of the free layer is fixed by a uniform magnetic field, sensitivity deteriorates and a magnetic domain control field of a track end portion where the magnetic domain control is particularly necessary is contrarily insufficient. As shown in JP-A-2001-84527, a method whereby a magnetic domain control layer is constructed by a stack layer of a layer of high coercivity and at least one of a ferromagnetic layer and an antiferromagnetic film has also been proposed.

Each of the above magnetic domain control structures has the following problems. According to the magnetic domain control system as shown in FIG. 8 such that the magnetic domain control layers comprising the magnet layers are arranged on both sides of the free layer, since a magnetic field which is developed at an interface where the magnetic domain control layer and the free layer are come into contact with each other is too strong, a region (dead region) where the magnetization of the free layer is hard to be rotated with respect to the medium field is caused. To reduce the dead region, it is sufficient to weaken a magnetic domain control force by simply thinning the thickness of magnet layer or by another method. In case of using such a method, however, since an inconvenience such that the Barkhausen noise or an output signal instability is contrarily caused, asymmetry of an output increases, or the like occurs, the magnetic domain control force of a certain extent is necessary.

When a recording density of the recording medium is large and the track width Twr which is defined by the width of free layer is wide, since a ratio of the dead region which occupies the track width Twr is small, such an influence does not cause a large problem. However, the track width Twr is decreasing more and more in accordance with a recent extreme increase in recording density. Therefore, the ratio of the dead region which occupies the track width Twr is increasing. Unless some countermeasures are taken, it is very difficult to assure enough sensitivity of the head without deteriorating characteristics of noises or the like.

As one of the countermeasures, a method whereby an interval between leads is set to be smaller than the interval of the track width Twr and the portion of the dead region of low sensitivity is not used for reading, thereby enabling a high reproduction output to be obtained has been proposed in, for example, JP-A-9-282618 or U.S. Pat. No. 5,739,990. However, according to such a method, there is a problem such that since a magnetic domain control force which is applied to the end portion of the free layer locating under the lead is weak, a side reading increases.

According to the magnetic domain control method as shown in FIG. 9 whereby the antiferromagnetic film is arranged, since the coupling field acts only on the portion where the antiferromagnetic film and the free layer are in contact with each other, the problem of the dead region as mentioned above does not occur. It is advantageous for realization of a narrow track. However, the exchange coupling field between the antiferromagnetic film and the free layer is weaker than that in case of using the magnet layers and it is insufficient as a magnetic domain control force.

When the apparatus such as an HDD or the like operates, although the magneto-resistive effect device generates heat, the exchange field of the antiferromagnetic film is deteriorated by the heat. Therefore, a problem such that the edge region of the free layer which ought to have been fixed also has sensitivity, the side reading occurs, the record on the adjacent track is read, and an error rate deteriorates occurs.

SUMMARY OF THE INVENTION

It is an object of the present invention to provide a magneto-resistive effect head capable of realizing large sensitivity and excellent side reading and noise characteristics.

According to the invention, in a magneto-resistive effect head, a magnetic domain control of a free layer is performed by using both of antiferromagnetic films and magnetic domain control layers including magnet layers. For example, the magnetic domain control is performed by arranging the magnetic domain control layers including magnet layers to both ends of a magneto-resistive effect device having a pair of antiferromagnetic films for performing the magnetic domain control of the free layer.

This structure differs from the structures of both of the foregoing prior arts. For example, in the method of JP-A-2001-84527 whereby the magnetic domain control layer is constructed by the stack of the layer of the high coercivity and at least one of the ferromagnetic layer and the antiferromagnetic film, the antiferromagnetic film is used for aligning the magnetization of the high coercivity layer in the track width direction and not used for the magnetic domain control of the free layer. Even if the high coercivity layer is used, since there is a problem of the dead region, the problem remains in case of realizing the narrow track. However, according to the construction of the invention, the problem of the dead region can be solved.

Figure 2:
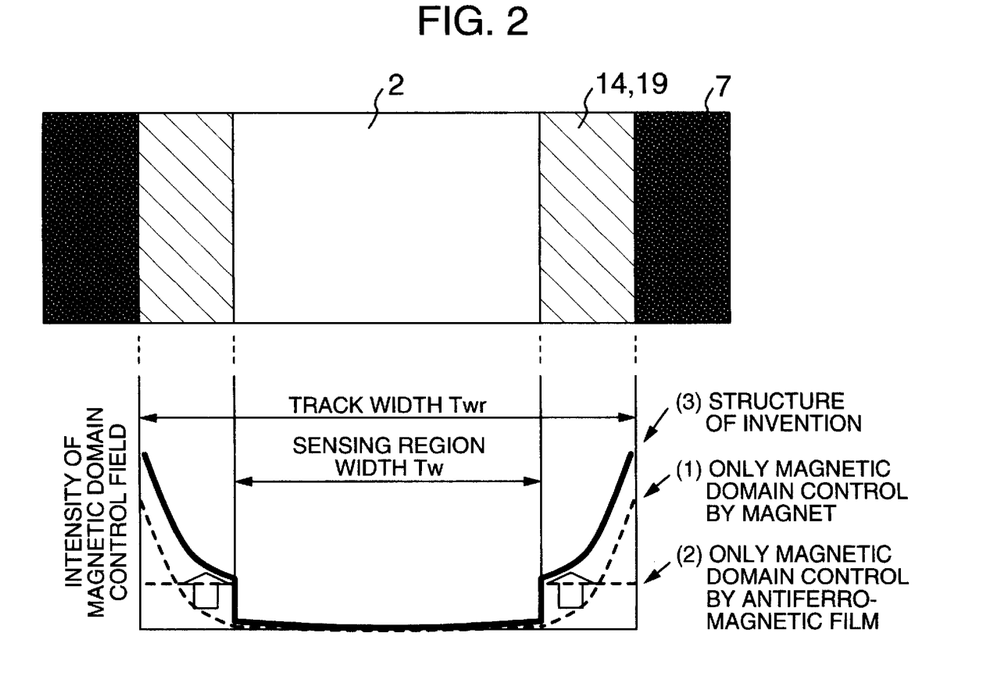
FIG. 2 is a diagram showing a magnetic domain control field distribution in a free layer according to each of a conventional magnetic domain control construction and a magnetic domain control construction of the invention.

FIG. 2 shows a distribution in the track width direction of the magnetic domain control field which is applied to the free layer. In case of the magnetic domain control using only the magnet layer of case (1), a record is read out from the track width portion Twr. It will be understood that although a magnetic field in the center portion of the track width is small, the magnetic field increases as a position approaches the track end portion. There is a problem such that the sensitivity deteriorates remarkably in the track end portion.

According to the magnetic domain control using only the antiferromagnetic film of case (2), the record is read out from the sensing region Tw of the center portion of the free layer. It will be understood that a uniform magnetic domain control field is applied only to the portion on which the antiferromagnetic film is overlaid and no magnetic field is applied to the sensing region. Therefore, although the realization of high sensitivity of the device can be expected, since the exchange coupling field intensity of the antiferromagnetic film is smaller than that of the magnet layer, there is a problem such that the record is read out from the whole free layer including not only the sensing region but also the end portions. To solve those problems, therefore, a new magnetic domain control construction using the magnet layers and the antiferromagnetic films has been invented.

According to a magnetic domain control using both of the magnet layers and the antiferromagnetic films, a distribution of a magnetic domain control field as shown by a bold line of case (3) is obtained. According to this magnetic domain control, the record is read out from the sensing region Tw of center portion of the free layer. In the end portion of the free layer, since the magnetic domain control is performed by a sufficient large effective magnetic field obtained by adding the powerful magnetic domain control field of the magnet layer and the exchange coupling field of the antiferromagnetic film, the problems of the side reading, noise, and the like do not occur.

On the other hand, since the sensing region is far from the magnet layer, no dead region is caused. Since the antiferromagnetic film is effective only to the end portion, no influence is exercised on this portion. Thus, the magnetic field which is applied to the sensing region is sufficiently weak and a magneto-resistive effect head having high sensitivity can be realized. By optimizing a thickness and a saturation magnetic flux density of the magnetic domain control layer including the magnet layers and a width of antiferromagnetic layer, a magneto-resistive effect head which has high sensitivity even if a track width is narrowed and in which a noise and side reading do not occur can be realized.

Other objects, features and advantages of the invention will become apparent from the following description of the embodiments of the invention taken in conjunction with the accompanying drawings.

DESCRIPTION OF THE EMBODIMENTS

An embodiment of a magnetic domain control system in a magneto-resistive effect head according to the invention will be described hereinbelow with reference to the drawings.

Figure 1:
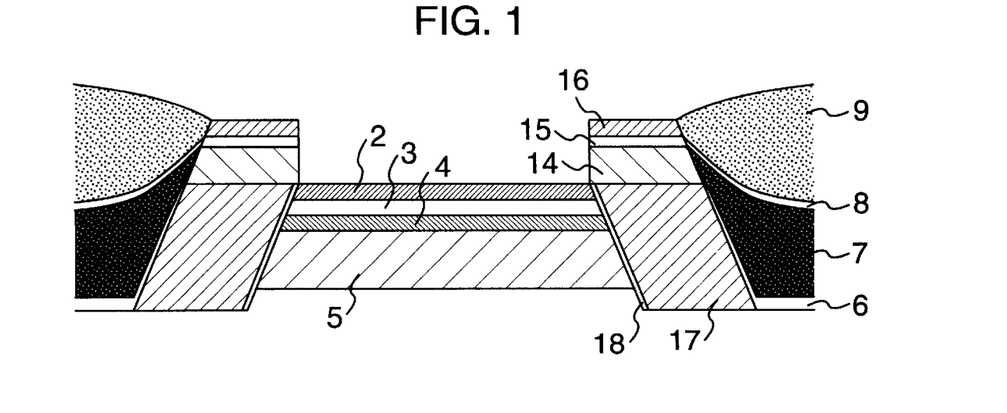
FIG. 1 is a diagram showing the first embodiment of the invention and is a constructional diagram of a magnetic domain control using both of a magnet layer and an antiferromagnetic film.

FIG. 1 shows a diagram of the first embodiment of a magneto-resistive effect head according to the invention when it is seen from an air bearing surface. The free layer 2 is formed via the spacer 3 over the pinned layer 4 whose magnetization has been fixed by the antiferromagnetic layer 5. End portions of a stack of the free layer 2, spacer 3, pinned layer 4, and antiferromagnetic layer 5 are shaved by the ion milling or the like, so that the stack has a trapezoidal shape. A soft magnetic domain control layer 17 is arranged in an end portion of the stack via a seed layer 18. An antiferromagnetic film 14 is formed on the layer 17. The seed layer 18 is made of Ta or it is not always necessary to form the seed layer 18. A first lead layer 16 is arranged over the antiferromagnetic film 14 via a seed layer 15. It is not always necessary to form the seed layer 15.

After the soft magnetic domain control layer 17 is formed, the antiferromagnetic film 14, seed layer 15, and lead layer 16 are formed on the free layer 2 and only a sensing region is removed by, for example, an RIE, an IM, or the like, so that those structures can be formed. If the antiferromagnetic film 14 is sufficiently thin, the exchange coupling with the free layer 2 does not occur. Therefore, the antiferromagnetic film 14 which is thinner than those of both end portions of the track of the free layer 2 can also remain in the sensing region of the center portion of the free layer 2 from which the record is read out. The magnetic domain control layers 7 made of magnet layers are further arranged on both sides of the soft magnetic domain control layer 17 via the seed layers 6. As a material of the magnet layer 7, it is possible to use one of a CoPt alloy containing Pt of 4 to 30 atom %, a CoCrPt alloy containing Cr of 2 to 15 atom %, CoCrPt—$ZrO_2$, and CoCrPt—$SiO_2$. A lead 9 is arranged over the magnetic domain control layer 7 via a seed layer 8. It is not always necessary to form the seed layer 8.

Although the first lead layer 16 and second lead layer 9 are formed by different processes, both of them are finally coupled and supply a current to the magneto-resistive effect device. In case of the system of performing the magnetic domain control only by the magnetic domain control layers 7 made of the conventional hard magnetic magnet layers shown in FIG. 8, the magnetic field which is developed near the magnetic domain control layers 7 is very large and obstructs the magnetization rotation of the free layer 2, so that the dead regions occur in the end portions of the free layer 2.

According to the magnetic domain control using the antiferromagnetic film 12 as shown in FIG. 9, since the exchange coupling between the antiferromagnetic film 12 and free layer 2 is weak, the side reading occurs, cross talk and side reading characteristics deteriorate, and noises increase. According to the structure shown in FIG. 1, since the distance from the magnetic domain control layer 7 to the free layer 2 is increased by a length corresponding to the width of soft magnetic domain control layer 17, the dead region decreases.

The antiferromagnetic film 14 controls the magnetization of the soft magnetic domain control layer 17 in the track width direction and the soft magnetic domain control layer 17 plays a role of a side shield. According to the structure of FIG. 1, since there is an effect such that the soft magnetic domain control layer 17 absorbs the surplus magnetic flux of an amount larger than that in FIGS. 3 or 7, which will be explained hereinlater, it is presumed that a side reading Δ in Table 1, which will be explained hereinlater, decreases. As mentioned above, by performing the magnetic domain control of the free layer 2 by simultaneously using the magnetic domain control layer 7 comprising the magnet layer and antiferromagnetic film 14, a magneto-resistive effect head having large sensitivity and excellent side reading and noise characteristics can be realized.

Figure 3:
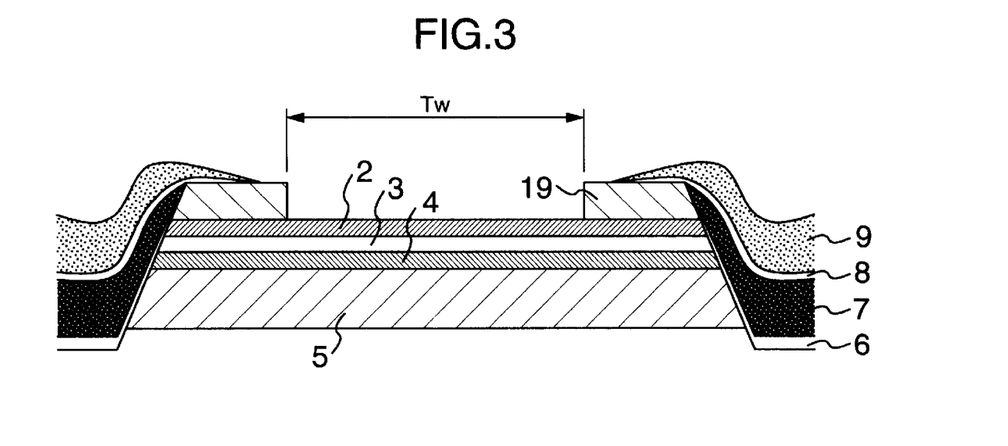
FIG. 3 is a constructional diagram showing the second embodiment of the invention.

FIG. 3 shows the second embodiment of a magneto-resistive effect head according to the invention in the case where it is seen from an air bearing surface. The free layer 2 is formed via the spacer 3 including a conductor such as copper over the pinned layer 4 whose magnetization has been fixed by the antiferromagnetic layer 5. Although antiferromagnetic films 19 are arranged on the free layer 2, it is desirable that the antiferromagnetic film 19 exists only in a region of a specific length of the track end portion of the free layer 2. The antiferromagnetic film 19 is formed by a method whereby, for example, after the free layer 2 is stacked, the antiferromagnetic film 19 is stacked on the whole surface of the free layer 2, a resist is formed in a portion where it is desired to leave the antiferromagnetic film 19, and a sensing region portion is shaved by the ion milling or the like.

If the antiferromagnetic film 19 is sufficiently thin, the exchange coupling with the free layer 2 does not occur. Therefore, the antiferromagnetic film 19 thinner than those of both end portions of the track of the free layer 2 can also remain in the sensing region of the center portion of the free layer 2 where the record is read out. The end portions of the stack of the antiferromagnetic layer 5, pinned layer 4, spacer 3, free layer 2, and antiferromagnetic film 19 are shaved by the ion milling or the like, so that the stack has a trapezoidal shape. The magnetic domain control layers 7 made of the magnet layers are arranged at the end portions of the stack via the seed layers 6 and the lead layers 9 are arranged over the magnetic domain control layers 7 via the seed layers 8, respectively. It is also possible that the seed layers are not formed. The lead layers 9 are more advantageous if they overlap the antiferromagnetic films 19 because a device resistance can be reduced. In a manner similar to the first embodiment mentioned above, as a material of the magnet layer 7, it is possible to use one of the CoPt alloy containing Pt of 4 to 30 atom %, CoCrPt alloy containing Cr of 2 to 15 atom %, CoCrPt—$ZrO_2$, and CoCrPt—$SiO_2$. In case of the system of performing the magnetic domain control by the conventional magnet layers 7 shown in FIG. 8, the magnetic field which is developed near the magnet layer 7 is very large and obstructs the rotation of the magnetization of the free layer 2, so that a wide dead region occurs and the sensitivity of the device is deteriorated.

According to the magnetic domain control using the antiferromagnetic films 12 as shown in FIG. 9, since the exchange coupling between the antiferromagnetic film 12 and free layer 2 is weak, the side reading occurs, the cross talk and side reading characteristics deteriorate, and the noise characteristics deteriorate. According to the structure shown in FIG. 3, the dead region near the magnetic domain control layers 7 is not used for reading the record. If the distance between the antiferromagnetic films 19 existing at the right and left end portions of the free layer 2 is short or if the antiferromagnetic films 19 are coupled, the record is read out from the sensing region Tw which is defined by the portion corresponding to the thin antiferromagnetic film 19 in the center portion of the free layer 2, so that the sensitivity is raised.

Figure 4:
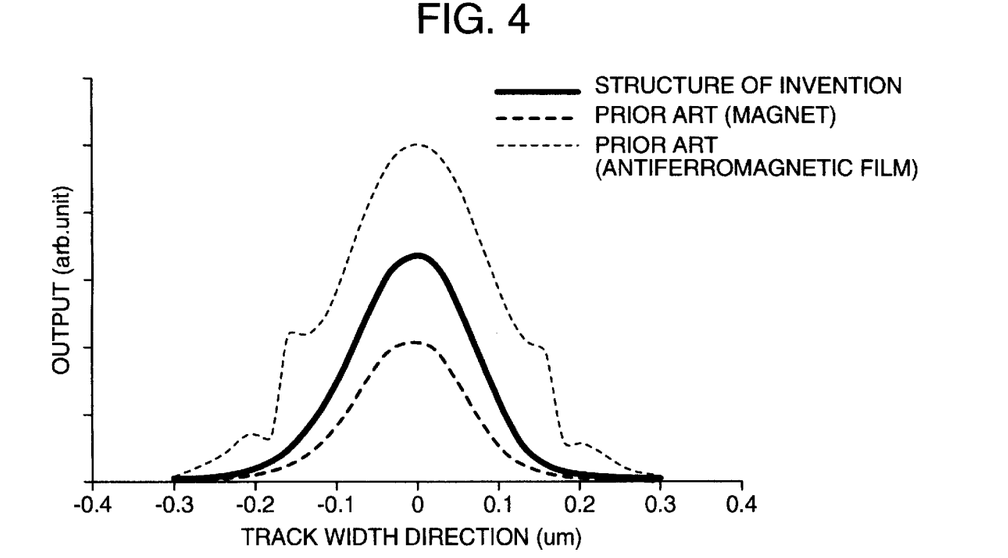
FIG. 4 is a diagram showing a micro track profile of each of a conventional structure and a structure of the invention.

As shown in FIG. 9, since shortage of the exchange coupling field in case of performing the magnetic domain control only by the antiferromagnetic films 12 is supplemented by the magnetic domain control field from the magnetic domain control layers 7, the problems of the side reading and noises are also solved. FIG. 4 shows calculation results of micro track profiles in the case where the magnetic domain control is performed by the magnetic domain control layers comprising the magnet layers 7 shown in FIG. 8, the case where the magnetic domain control is performed only by the antiferromagnetic films 12 shown in FIG. 9, and the case where the magnetic domain control is performed by the structure of the invention, respectively.

The micro track profile shows an output change of the device which is caused when the head is moved in the track width direction over a track having a micro width (micro track), that is, it shows sensitivity in the track width direction of the head. Generally, a value of the micro track profile of the track end portion is small because the sensitivity is low and a value of the micro track profile of the track center portion is large because the sensitivity is high. The micro track profile is normalized and its half amplitude pulse width is obtained. This half amplitude pulse width is defined as an effective track width Twr50. The micro track profile is integrated and normalized, and a width between the positions of 5% and 95% of the resultant normalized value is obtained. This width is defined as a magnetic track width Twr5–95%. Generally, the larger a difference Δ between Twr5–95% and Twr50 is, the larger the side reading is. If the side reading is large, the records on the adjacent tracks which inherently do no need to be read out are read, so that a problem such that an error rate deteriorates occurs.

It is now assumed that the track width Twr of the system of performing the magnetic domain control by the magnet layers, the width of the system of performing the magnetic domain control only by the antiferromagnetic films, and the width of sensing region Tw of the free layer according to the invention are equal to 180 nm. It is now assumed that the width of micro track is equal to 10 nm, a saturation magnetic flux density of the magnet layer is equal to 1.0 T, and the exchange coupling by the antiferromagnetic film is equal to 79577 A/m (=1,000 Oe). When referring to FIG. 4, although the output in case of performing the magnetic domain control only by the antiferromagnetic films is largest, undulation is seen on the profile and the profile is asymmetric with respect to the right and left. In case of performing the magnetic domain control only by the magnet layers, although the shape of the profile is smooth and symmetric with respect to the right and left, the output is small. Table 1 is a comparison table of the effective track width Twr50, the magnetic track width Twr5–95%, the difference Δ= (Twr5–95%–Twr50) between them, and the normalized output.

TABLE 1

|  | Twr50 (nm) | Twr5–95% (nm) | Δ (nm) | Normalized output |
|---|---|---|---|---|
| Structure of invention | 176 | 242 | 66.3 | 1.8 |
| Prior art (magnet) | 160 | 228 | 67.9 | 1.0 |
| Prior art (antiferromagnetic films) | 226 | 317 | 90.1 | 3.3 |

According to the magnetic domain control only by the antiferromagnetic films, it will be understood that although the output is very large, the side reading is larger than the ordinary one by 20 nm or more, and the magnetic domain control power is insufficient.

Figure 5:
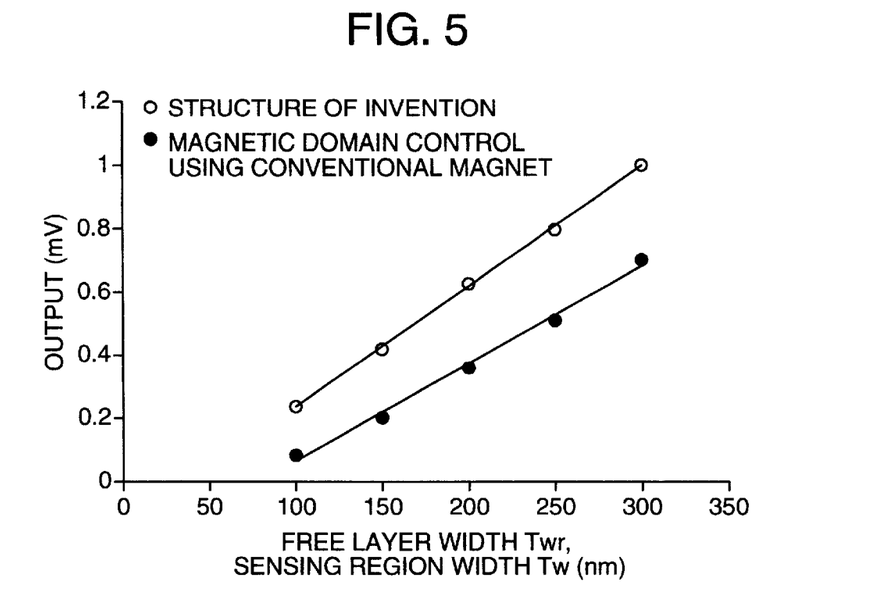
FIG. 5 is a diagram showing dependency of an output on a track width and a sensing region width of each of a conventional structure and a structure of the invention.

According to the construction of the invention, in spite of the fact that the output that is 1.8 times as large as that of the magnetic domain control system using the magnet layers is obtained, the difference Δ= (Twr5–95%–Twr50) between the magnetic track width and the effective track width is not widened but narrowed. This means that the dead region decreases. FIG. 5 shows calculation results of the output changes caused when the track width Twr of the free layer and the width Tw of the sensing region change in the magnetic domain control layer using the magnet layers and the construction of the invention, respectively. In each width, the output according to the construction of the invention is larger than that of the magnetic domain control layer using the magnet layers.

Figure 6:
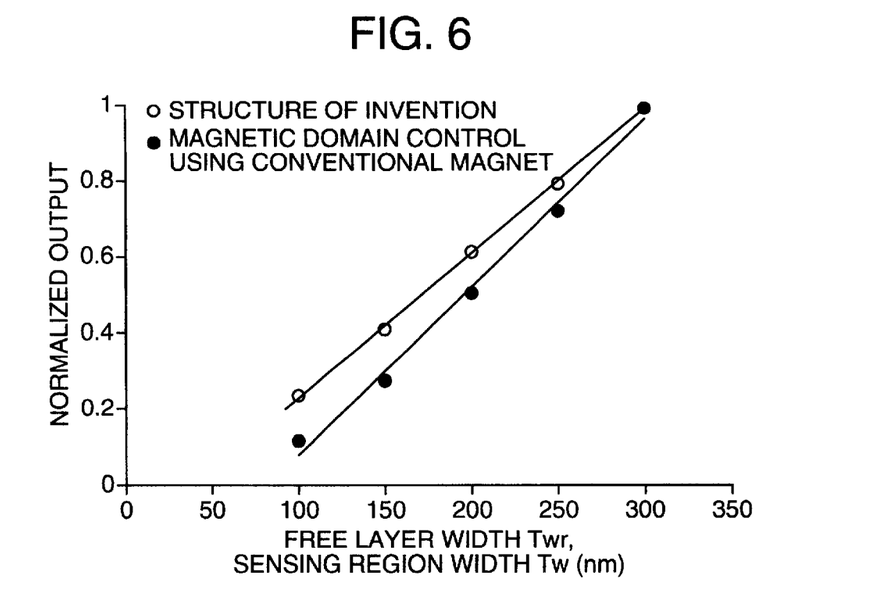
FIG. 6 is a diagram showing dependency of a normalized output on a track width and a sensing region width of each of a conventional structure and a structure of the invention.

FIG. 6 shows a graph obtained by normalizing the output by setting the case where the track width Twr or the width Tw of the sensing region is equal to 300 nm to a reference. It will be understood that a decreasing ratio of the output in association with the reduction of the track width according to the invention is smaller than that in case of the magnetic domain control layers using the magnet layers. This means that the invention is hard to be influenced by the dead region as compared with the conventional structure using the magnet layers. By performing the magnetic domain control of the free layer 2 by using both of the magnetic domain control layers 7 comprising the magnet layers and the antiferromagnetic films 19 as mentioned above, a magneto-resistive effect head having large sensitivity and excellent side reading and noise characteristics can be realized.

Figure 7:
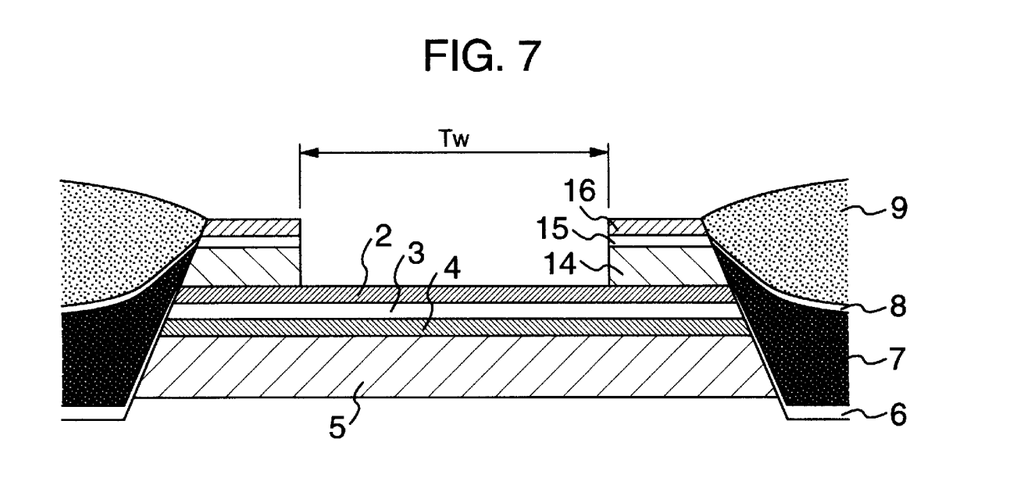
FIG. 7 is a constructional diagram showing the third embodiment of the invention.

FIG. 7 shows the third embodiment of a magneto-resistive effect head according to the invention which is obtained when it is seen from an air bearing surface. The free layer 2 is formed via the spacer 3 including a conductor such as copper over the pinned layer 4 whose magnetization has been fixed by the antiferromagnetic layer 5. Although antiferromagnetic films 14 are arranged on the free layer 2, it is desirable that the antiferromagnetic film 14 exists only in a region of a specific length of the track end portion of the free layer. The first lead layers 16 are stacked over the antiferromagnetic films 14 via the seed layers 15. It is not always necessary to form the seed layers 15.

As a forming method, for example, the antiferromagnetic film 14, seed layer 15, and lead layer 16 are sequentially stacked on the free layer 2 and the lead layer 16 in the sensing region is removed by the RIE or the like. The remaining lead layers are used as masks, the ion milling is performed, and the antiferromagnetic film in the sensing region is removed, thereby forming. If the antiferromagnetic film is sufficiently thin, the exchange coupling with the free layer does not occur. Therefore, the antiferromagnetic film which is thinner than that of the track portion of the free layer can also remain in the sensing region of the center portion of the free layer from which the record is read out.

A resist is further formed on the stack of the antiferromagnetic layer 5, pinned layer 4, spacer 3, free layer 2, antiferromagnetic films 14, seed layers 15, and lead layers 16 as mentioned above, and the end portions are shaved by the ion milling or the like, thereby shaping the stack in a trapezoidal shape. The magnetic domain control layers 7 comprising the magnet layers are arranged in the end portions of the stack via the seed layers 6. The second lead layers 9 are arranged over the magnetic domain control layers 7 via the seed layers 8. It is not always necessary to form the seed layers 8. In a manner similar to the first and second embodiments mentioned above, as a material of the magnet layer 7, it is possible to use one of the CoPt alloy containing Pt of 4 to 30 atom %, CoCrPt alloy containing Cr of 2 to 15 atom %, CoCrPt—$ZrO_2$, and CoCrPt—$SiO_2$. Although the first lead layer 16 and second lead layer 9 are formed by different processes, both of them are finally coupled and supply a current to the magneto-resistive effect device. Since it is sufficient that the lead layer 9 is in contact with the lead layer 16, an influence by the overlap amount of the lead layer 9 is not large, so that the structure of a large process margin is obtained.

In case of the system of performing the magnetic domain control by the conventional magnet layers 7 shown in FIG. 8, the magnetic field which is developed near the magnet layers 7 is very large and obstructs the magnetization rotation of the free layer 2, so that the wide dead regions occur and the sensitivity of the device deteriorates.

According to the magnetic domain control using the antiferromagnetic film 12 as shown in FIG. 9, since the exchange coupling between the antiferromagnetic film 12 and free layer 2 is weak, the side reading occurs, cross talk and side reading characteristics deteriorate, and noise characteristics deteriorate. According to the structure shown in FIG. 7, since the dead region near the magnetic domain control layer 7 is not used for reading but the record is read out from the right and left antiferromagnetic films 14 or the sensing region Tw that is defined by the portion corresponding to the thin antiferromagnetic film, the sensitivity rises.

As shown in FIG. 9, since the shortage of the exchange coupling field in case of performing the magnetic domain control only by the antiferromagnetic films is supplemented by the magnetic domain control field from the magnetic domain control layers 7, the problems of the side reading and noises are also solved. According to the structure of FIG. 7, characteristics as shown in FIGS. 4, 5, and 6 shown in the second embodiment are obtained. As mentioned above, by performing the magnetic domain control of the free layer 2 by using both of the magnetic domain control layers 7 comprising the magnet layers and the antiferromagnetic films 14, a magneto-resistive effect head having large sensitivity and excellent side reading and noise characteristics can be realized.

By using the magnetic domain control construction of the free layer of the magneto-resistive effect head according to the invention, even for the realization of the narrow track, as compared with the device of the magnetic domain control construction using the conventional magnet layers, a magneto-resistive effect head having large sensitivity and excellent side reading and noise characteristics can be realized.

It should be further understood by those skilled in the art that the foregoing description has been made on embodiments of the invention and that various changes and modifications may be made in the invention without departing from the spirit of the invention and the scope of the appended claims.

What is claimed is:

1. A magneto-resistive effect head comprising:
   an antiferromagnetic layer;
   a pinned layer which is formed on said antiferromagnetic layer and whose magnetizing direction has been fixed;
   a spacer formed on said pinned layer;
   a free layer formed on said spacer; and magnetic domain control layers having antiferromagnetic films and magnet layers for performing a magnetic domain control of said free layer, wherein each of said antiferromagnetic films is formed on said free layer.

2. A head according to claim 1, wherein said magnet layer is made of one of a CoPt alloy containing Pt of 4 to 30 atom %, a CoCrPt alloy containing Cr of 2 to 15 atom %, CoCrPt—$ZrO_2$, and CoCrPt—$SiO_2$.

3. A head according to claim 1, comprising at least one lead layer for supplying a current to a stack of said antiferromagnetic layer, said pinned layer, said spacer, and said free layer.

4. A head according to claim 1, wherein the antiferromagnetic films and magnet layers have at least one of a width, thickness and spacing thereof controlled compared to said free layer, for controlling the magnetic domain control of said free layer.

5. A magneto-resistive effect head comprising:
   an antiferromagnetic layer;
   a pinned layer which is formed on said antiferromagnetic layer and whose magnetizing direction has been fixed;
   a spacer formed on said pinned layer;
   a free layer formed on said spacer;
   soft magnetic domain control layers arranged adjacent both end portions of a stack of said antiferromagnetic layer, said pinned layer, said spacer, and said free layer;
   antiferromagnetic films formed on said soft magnetic domain control layers; and
   magnet layers arranged on both sides of said soft magnetic domain control layers.

6. A head according to claim 5, comprising:
   first lead layers formed over said antiferromagnetic films; and
   second lead layers formed over said magnet layers so as to be coupled with said first lead layers.

7. A head according to claim 6, wherein seed layers are formed between both end portions of said stack and said soft magnetic domain control layers, between said antiferromagnetic film and said first lead layer, between said soft magnetic domain control layer and said magnet layer, and between said magnet layer and said second lead layer, respectively.

8. A head according to claim 7, wherein said magnet layer is made of one of a CoPt alloy containing Pt of 4 to 30 atom %, a CoCrPt alloy containing Cr of 2 to 15 atom %, CoCrPt—$ZrO_2$, and CoCrPt—$SiO_2$.

9. A head according to claim 5, wherein the antiferromagnetic films and soft magnetic domain control magnet layers have at least one of a width, thickness and spacing thereof controlled compared to said free layer, for controlling the magnetic domain control of said free layer.

10. A magneto-resistive effect head comprising:
    an antiferromagnetic layer;
    a pinned layer which is formed on said antiferromagnetic layer and whose magnetizing direction has been fixed;
    a spacer formed on said pinned layer;
    a free layer formed on said spacer;
    antiferromagnetic films formed on both end surfaces of said free layer;
    magnet layers arranged adjacent both end portions of a stack of said antiferromagnetic layer, said pinned layer, said spacer, said free layer, and said antiferromagnetic films; and
    lead layers formed over said magnet layers and said antiferromagnetic films, respectively.

11. A head according to claim 10, wherein seed layers are formed between said stack and said magnet layers and between said magnet layers and said antiferromagnetic film and said lead layers, respectively.

12. A head according to claim 11, wherein said magnet layer is made of one of a CoPt alloy containing Pt of 4 to 30 atom %, a CoCrPt alloy containing Cr of 2 to 15 atom %, CoCrPt—ZrO$_2$, and CoCrPt—SiO$_2$.

13. A head according to claim 10, wherein the antiferromagnetic films and magnet layers have at least one of a width, thickness and spacing thereof controlled compared to said free layer, for controlling the magnetic domain control of said free layer.

14. A magneto-resistive effect head comprising:
- an antiferromagnetic layer;
- a pinned layer which is formed on said antiferromagnetic layer and whose magnetizing direction has been fixed;
- a spacer formed on said pinned layer;
- a free layer formed on said spacer;
- antiferromagnetic films formed on both end surfaces of said free layer;
- magnet layers arranged adjacent both end portions of a stack of said antiferromagnetic layer, said pinned layer, said spacer, said free layer, and said antiferromagnetie films.

15. A head according to claim 14, comprising:
- lead layers formed over said antiferromagnetic films; and
- second lead layers formed over said magnet layers so as to be coupled with said first lead layers.

16. A head according to claim 15, wherein seed layers are formed between said stack and said magnet layers, between said antiferromagnetic film and said first lead layers, and between said magnet layer and said second lead layers, respectively.

17. A head according to claim 16, wherein said magnet layer is made of one of a CoPt alloy containing Pt of 4 to 30 atom %, a CoCrPt alloy containing Cr of 2 to 15 atom %, CoCrPt—ZrO$_2$, and CoCrPt—SiO$_2$.

18. A head according to claim 14, wherein the antiferromagnetic films and magnet layers have at least one of a width, thickness and spacing thereof controlled compared to said free layer, for controlling the magnetic domain control of said free layer.

* * * * *